US011373852B2

(12) United States Patent
Mizrahi et al.

(10) Patent No.: US 11,373,852 B2
(45) Date of Patent: Jun. 28, 2022

(54) MITIGATION OF CHARGING ON OPTICAL WINDOWS

(71) Applicant: IonQ, Inc., College Park, MD (US)

(72) Inventors: Jonathan Albert Mizrahi, Silver Spring, MD (US); Kenneth Wright, Berwyn Heights, MD (US); Jason Madjdi Amini, Takoma Park, MD (US)

(73) Assignee: IONQ, INC., College Park, MD (US)

( * ) Notice: Subject to any disclaimer, the term of this patent is extended or adjusted under 35 U.S.C. 154(b) by 176 days.

(21) Appl. No.: 16/909,669

(22) Filed: Jun. 23, 2020

(65) Prior Publication Data

US 2021/0013021 A1 Jan. 14, 2021

Related U.S. Application Data

(60) Provisional application No. 62/871,367, filed on Jul. 8, 2019.

(51) Int. Cl.
*H01J 49/42* (2006.01)
*G06N 10/00* (2022.01)

(52) U.S. Cl.
CPC ............ *H01J 49/422* (2013.01); *G06N 10/00* (2019.01)

(58) Field of Classification Search
CPC ............................... H01J 49/422; G06N 10/00
USPC ................................ 250/281, 282, 283, 290
See application file for complete search history.

(56) References Cited

U.S. PATENT DOCUMENTS

2013/0187044 A1* 7/2013 Ding .................... H01J 49/066 250/292
2019/0304765 A1* 10/2019 Hoyes .................... H01J 49/40
2020/0118623 A1* 4/2020 Meredith ........... G11C 13/0014

* cited by examiner

*Primary Examiner* — Nicole M Ippolito
(74) *Attorney, Agent, or Firm* — ArentFox Schiff LLP

(57) ABSTRACT

Aspects of the present disclosure describe techniques for mitigating charging on optical windows. For example, a device for mitigating charges inside a chamber of a trapped ion system is described that includes an array of parallel wires formed from a single, conductive plate by cutting elongated gaps through an entire thickness of the conductive plate that separate the wires, an outer portion of the conductive plate to which the wires are attached is configured to position the wires to run parallel to one or more trapped ions in the chamber and to position the wires between a dielectric component of the chamber and the one or more trapped ions. A chamber with such an array of parallel wires and a method of using such an array of parallel wires are also described.

21 Claims, 7 Drawing Sheets

MITIGATION OF CHARGING ON OPTICAL WINDOWS

CROSS REFERENCE TO RELATED APPLICATION(S)

This application claims the benefit of U.S. Provisional Application Ser. No. 62/871,367, entitled "MITIGATION OF CHARGING ON OPTICAL WINDOWS" and filed on Jul. 8, 2019, which is expressly incorporated by reference herein in its entirety.

BACKGROUND

Aspects of the present disclosure relate generally to charge accumulation, and more specifically, to techniques for mitigating the effects of charge that accumulates on optical windows in a chamber.

Trapped ion quantum computers use individual ions for quantum information processing. Other devices may also use individual ions for other types of operations. The ions in a trapped ion quantum computer are laid out in a linear chain inside a chamber, with typical spacing between the ions of around 4-5 microns (μm). Because these ions carry an electric charge, they are highly sensitive to background electric fields. Nearby dielectric surfaces, such as vacuum viewports or optical windows (also referred to as optical ports), tend to build up surface charges that drift over time and cause an unstable electric field environment where the ions are located. These background fields can be so large and unstable so as to make trapped ion quantum computing impossible because of the significant effect they may have of the ions in the linear chain. Therefore, it is generally required to shield the ions from these dielectric surfaces. However, as part of various operations of the trapped ion quantum computers it is also necessary to image the ions through a viewport with high transmission and high numerical aperture, and to illuminate the ions with lasers through such viewports, again with high transmission. Therefore these types of systems are faced with the problem of creating a shield which both effectively shields the ions from stray electric fields (and is therefore an electrical conductor), but is also highly optically transmissive to enable imaging and laser illumination.

Therefore, it is desirable for new techniques to be developed that provide both effective shielding of the ions and high optical transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a device for mitigating charges inside a chamber of a trapped ion system is described that includes an array of parallel wires formed from a single, conductive plate by cutting elongated gaps through an entire thickness of the conductive plate that separate the wires, an outer portion of the conductive plate to which the wires are attached is configured to position the wires to run parallel to one or more trapped ions in the chamber and to position the wires between a dielectric component of the chamber and the one or more trapped ions.

In another aspect of this disclosure, a chamber of a trapped ion system is described that includes a dielectric component; a trap; and an array of parallel wires formed from a single, conductive plate by cutting elongated gaps through an entire thickness of the conductive plate that separate the wires, an outer portion of the conductive plate to which the wires are attached is configured to position the wires to run parallel to one or more trapped ions in the trap and to position the wires between the dielectric component and the trap.

In another aspect of this disclosure, a method for mitigating charges inside a chamber of a trapped ion system is described that includes providing inside the chamber, between a dielectric component of the chamber and a trap, an array of parallel wires formed from a single, conductive plate by cutting elongated gaps through an entire thickness of the conductive plate that separate the wires, an outer portion of the conductive plate to which the wires are attached is configured to position the wires to run parallel to one or more trapped ions in the trap and to position the wires between the dielectric component and the trap; and performing one or more quantum operations in the trapped ion system with the array of parallel wires between the dielectric component and the one or more trapped ions in the trap.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
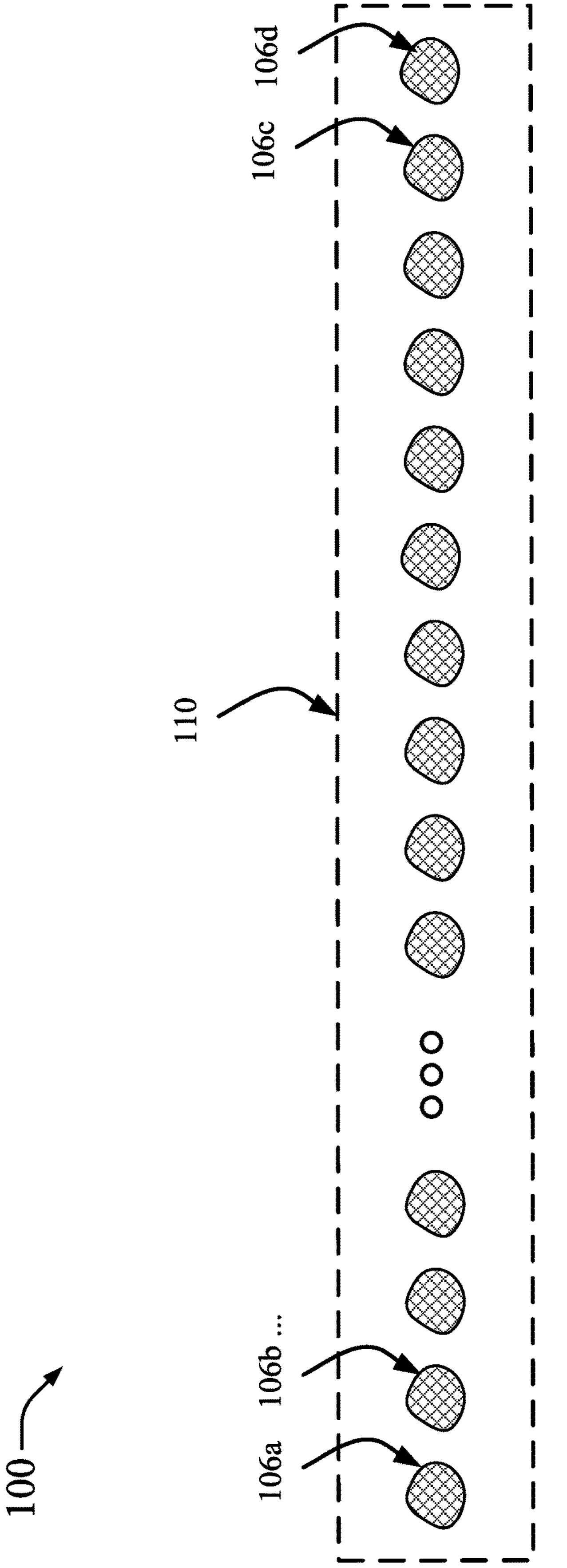
FIG. 1 illustrates a view of trapping of atomic ions in a linear crystal within a chamber in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, dielectric surfaces that are near trapped ions in a chamber, such as vacuum viewports, optical windows, or optical ports, tend to build up surface charges that drift over time and cause an unstable electric field environment where the ions are located. Therefore, shielding of the ions from these dielectric surfaces is generally required. However, it is also necessary to image the ions through a viewport with high transmission and high numerical aperture, and to illuminate the ions with lasers through such viewports, again with high transmission. As such the shielding that is provided also needs to allow for both imaging and illumination of the ions.

One well-known solution is to use a transmissive conductive oxide, such as indium tin oxide (ITO). The difficulty with ITO is that while it has high transmissibility in the visible part of the spectrum, it becomes highly absorptive in the ultraviolet (UV), which is typically the part of the spectrum used for imaging and illumination. For example, the wavelengths of interest for Ytterbium ion trapping are 369 nanometers (nm) and 355 nm, and ITO absorbs a significant amount of light at these wavelengths reducing its effectiveness as a shielding option for trapped ions near dielectric surfaces.

Another well-known solution is to use a two-dimensional grid of wires (e.g., a wire mesh), with fine wires and relatively large gaps between them for imaging and illumination. The wires create a Faraday cage, shielding the ions from stray fields. The amount of light blocked is determined by the wire fill-factor, which can be of order of about 10%, allowing about 90% transmission. The disadvantage of this approach is that it distorts any light that passes through it, creating distorted images. Light tends to diffract off the wires, creating a two-dimensional pattern of diffraction spots, superimposed on the main image. For trapped ion quantum computing, it is critical to be able to resolve each ion independently, with minimal crosstalk. Because of the diffraction from the wires in the mesh, some light from one ion diffracts and overlaps with the image of another ion, making it impossible to distinguish from which ion a photon came. The crosstalk produced by using these types of woven meshes is detrimental to the performance of a trapped ion quantum computer.

This disclosure describes a different solution in which a one-dimensional array of wires, laser cut out of a single piece of metal is used to provide the necessary shielding. By using a one-dimensional array, it is possible to control the direction of scatter and diffraction. By making the wires run parallel to the direction of the ion chain, all diffraction is perpendicular to the direction of the chain, and therefore there is no crosstalk. By using a single laser cut piece, for example, rather than a mesh of woven wires, the effective wires are all in a same plane, rather than going up and down in a weave. This further ensures that there will be little to no optical crosstalk. Also, by using a single laser cut piece, it is possible to keep the shield extremely thin, eliminating any deleterious effects caused by the wire side walls. Moreover, the optical transmissibility is at least as good as that of a two-dimensional mesh, and tightly controlled by tuning the wire thickness and spacing. In one implementation, the thickness of the metal piece can be approximately 30 microns (μmm), with wires of approximately 50 μm separated by gaps of approximately 460 μm. As used herein, the term approximately means a variation that is 1%, 2%, 3%, 4%, 5%, 10%, 15%, or 20% from a nominal value.

Additional details regarding the implementation of techniques for mitigating the effects of charge that accumulates on optical windows or ports in a chamber are provided in more detail in connection with FIGS. 1-5 described below.

FIG. 1 shows a diagram 100 that illustrates a multiple atomic ions 106*a*-106*d* forming a linear crystal or chain 110 using a linear radio frequency (RF) Paul trap (the linear crystal 100 can be inside a vacuum chamber not shown), which may be referred to as an ion trap or simply a trap. As used in this disclosure, the terms "atomic ions," "atoms," and "ions" may be used interchangeably to describe the particles that are to be confined, or are actually confined, in a trap. In the example shown in FIG. 1, a vacuum chamber in a quantum system includes electrodes for trapping multiple (e.g., N>1, where N is an integer number as large as 100 or even larger, with some implementation having N=32) atomic Ytterbium ions (e.g., $^{171}Yb^+$ ions) into the linear crystal 110 and are laser-cooled to be nearly at rest. The number of atomic ions trapped can be configurable and more or fewer atomic ions may be trapped. The atoms are illuminated with laser (optical) radiation tuned to a resonance in $^{171}Yb^+$ and the fluorescence of the atomic ions is imaged onto a camera. In this example, atomic ions are separated by about 4-5 μm from each other as can be shown by fluorescence. The separation of the atomic ions is determined by a balance between the external confinement force and Coulomb repulsion.

Figure 2:
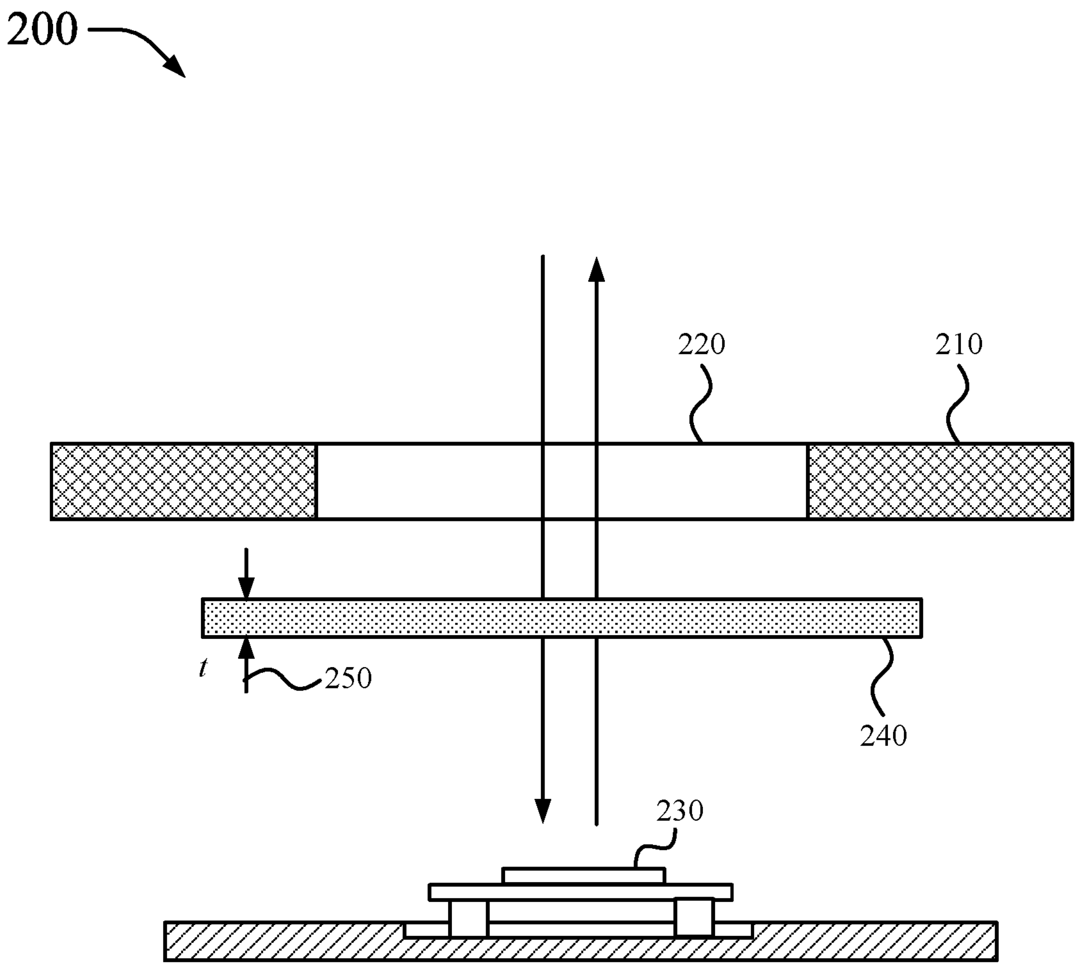
FIG. 2 illustrates a cross-sectional view of a plate positioned to shield ions in a trap in accordance with aspects of the disclosure.

FIG. 2 illustrates a diagram 200 showing a cross-sectional view of a plate 240 positioned to shield ions in a trap 230 in accordance with aspects of the disclosure. A portion of a chamber 210 is shown with a dielectric component 220 through which imaging and illumination are performed. The dielectric component 220 may be an optical window or optical port, for example. As described above, the plate 240 may include a one-dimensional array of wires made from a single piece of metal to provide the necessary shielding, where the wires run parallel to the direction of the ion chain such that all diffraction is perpendicular to the direction of the chain, and therefore no crosstalk results from the shielding.

Figure 3A:
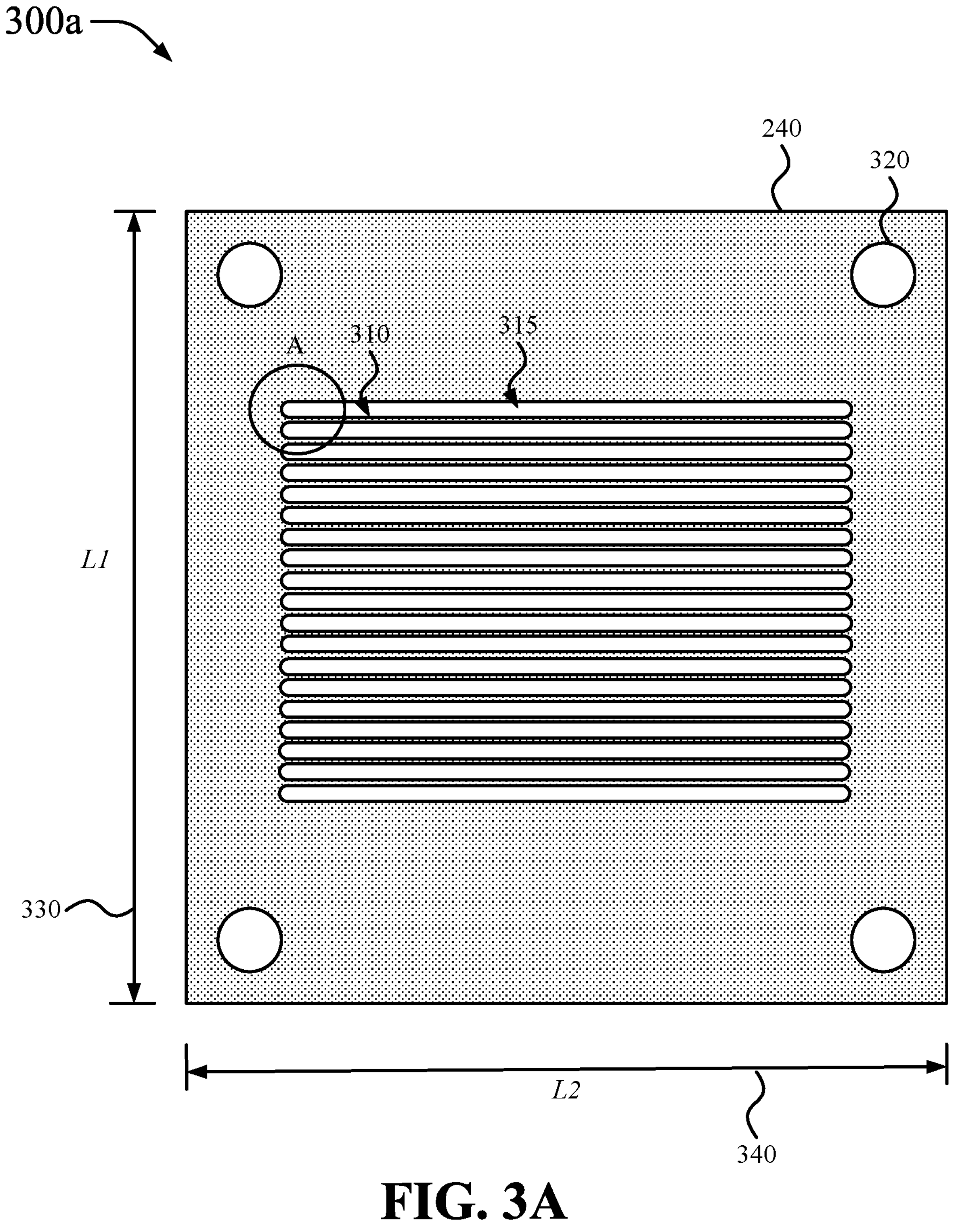
FIG. 3A illustrates a top view of a plate with parallel wires for shielding ions in a trap in accordance with aspects of the disclosure.

FIG. 3A illustrates a diagram 300*a* showing a top view of the plate 240 with parallel wires 310 for shielding ions in a trap in accordance with aspects of the disclosure. In this example, the plate 240 includes an array (e.g., a one-dimensional array) of parallel wires 310 formed from a single, conductive plate (e.g., metal plate) by cutting elongated gaps 315 through an entire thickness of the conductive plate to separate the wires. An outer portion of the plate 240 to which the wires 310 are attached, which may be referred to as a frame, is configured to position the plate 240 such that the wires 310 run parallel to one or more trapped ions in a chamber. The outer portion of the plate 240 may include fastening fixtures 320 that may be used to position the wires between a dielectric component of the chamber and the one or more trapped ions. In an example, the fastening fixtures 320 may be used to screw or bolt the plate 240 in the right position inside the chamber.

As shown in the diagram 300*a*, the plate 240 may be square or rectangular, with dimensions of L1 330 for height, L2 340 for length, and a thickness t 250 (as shown in the diagram 200 in FIG. 2). In a non-limiting example, the plate 240 is a square plate with L1=20 millimeters (mm), L2=20 mm, and t=30 μm. Although not specified, in one example, the length of the wires 310 and the gaps 315 may greater than approximately 60% of the length L2 340. For the example where L2=20 mm, the length of the wires 310 and the gaps 315 may be greater than approximately 12 mm, including but not limited to 13 mm, 14 mm, 15 mm, and 16 mm, for example.

Figure 3B:
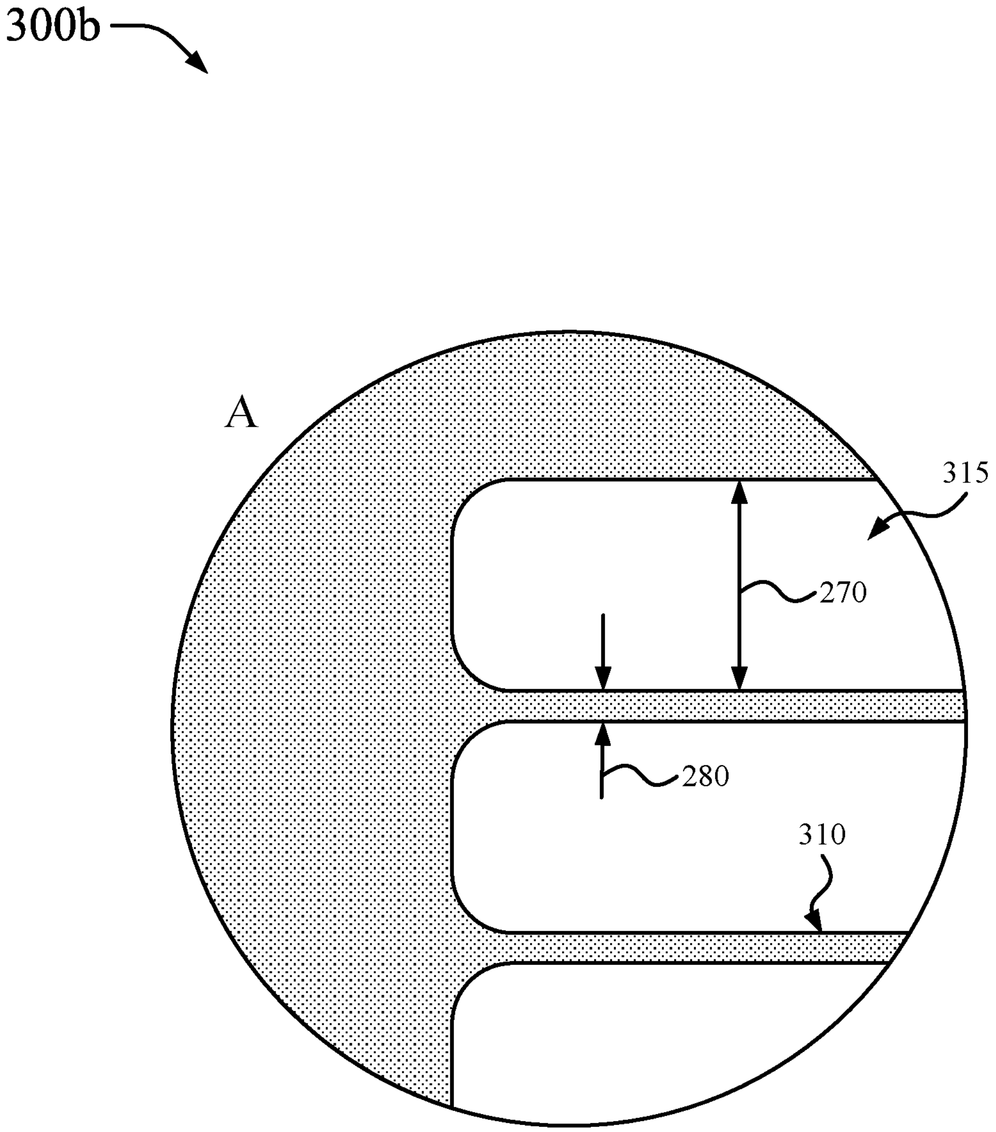
FIG. 3B illustrates an expanded view of the place with parallel wires in FIG. 3A in accordance with aspects of the disclosure.

Also shown in the diagram 300*a* is a view A, that is further expanded in a diagram 300*b* in FIG. 3B. In the diagram 300*b* one end of the top wires 310 in the view A is shown, where the wires 310 are separated by the gaps 315 cut (e.g., by laser cutting) through the conductive plate that makes the plate 240. As shown, the ends of the gaps 315 have rounded corners. The cutting technique we used (e.g., laser cutting) could actually make much sharper corners. In one implementation, the corners were rounded to reduce the stress that would result from a sharp 90 degree angle at the point where each wire hits the frame. One concern was that a sharp, high stress corner would increase the chance of the part (e.g., the plate 240) would be damaged during handling because the wires are quite thin and fragile. Therefore, by rounding the corners the part is made more robust.

As shown in the diagram 300*b*, a width 280 of the wires 310 is much smaller than a width 270 of the gaps 315. In a non-limiting example, the width 270 of the gaps 315 may be approximately 460 μm, and the width 280 of the wires 310 may be approximately 50 μm.

Figure 3C:
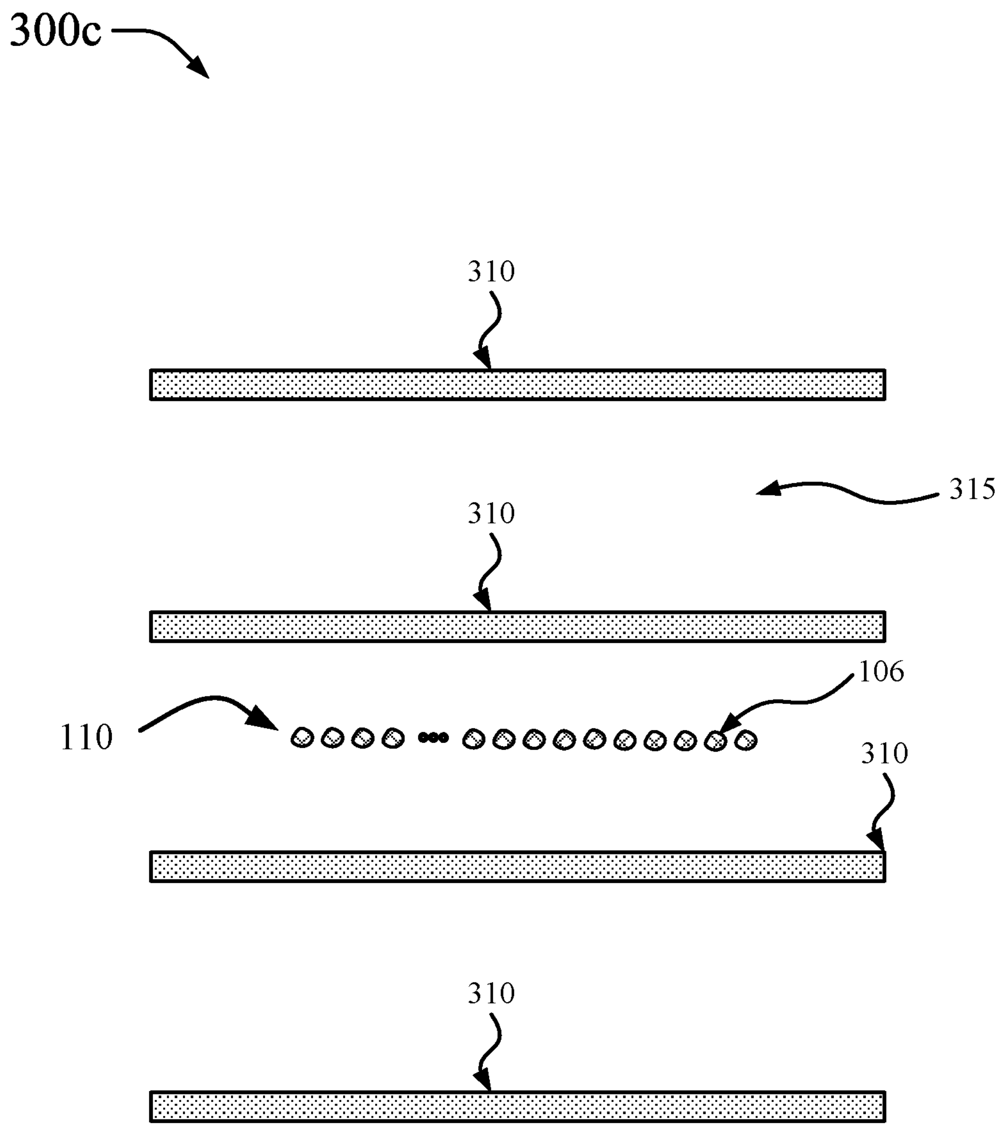
FIG. 3C illustrates a view of the ions running parallel to the shielding wires in accordance with aspects of the disclosure.

FIG. 3C shows a diagram 300*c* that illustrates a view through the parallel wires 310 of one or more ions 106 in the linear chain 110 positioned to run parallel to the parallel wires 310. It is to be understood that the ions 106, the wires 310, and the gaps 315 are not drawn to scale but are provided simply to illustrate that by making the wires 310 run parallel to the direction of the ion chain 110, all diffraction is perpendicular to the direction of the ion chain 110, and therefore there is no crosstalk.

Figure 4:
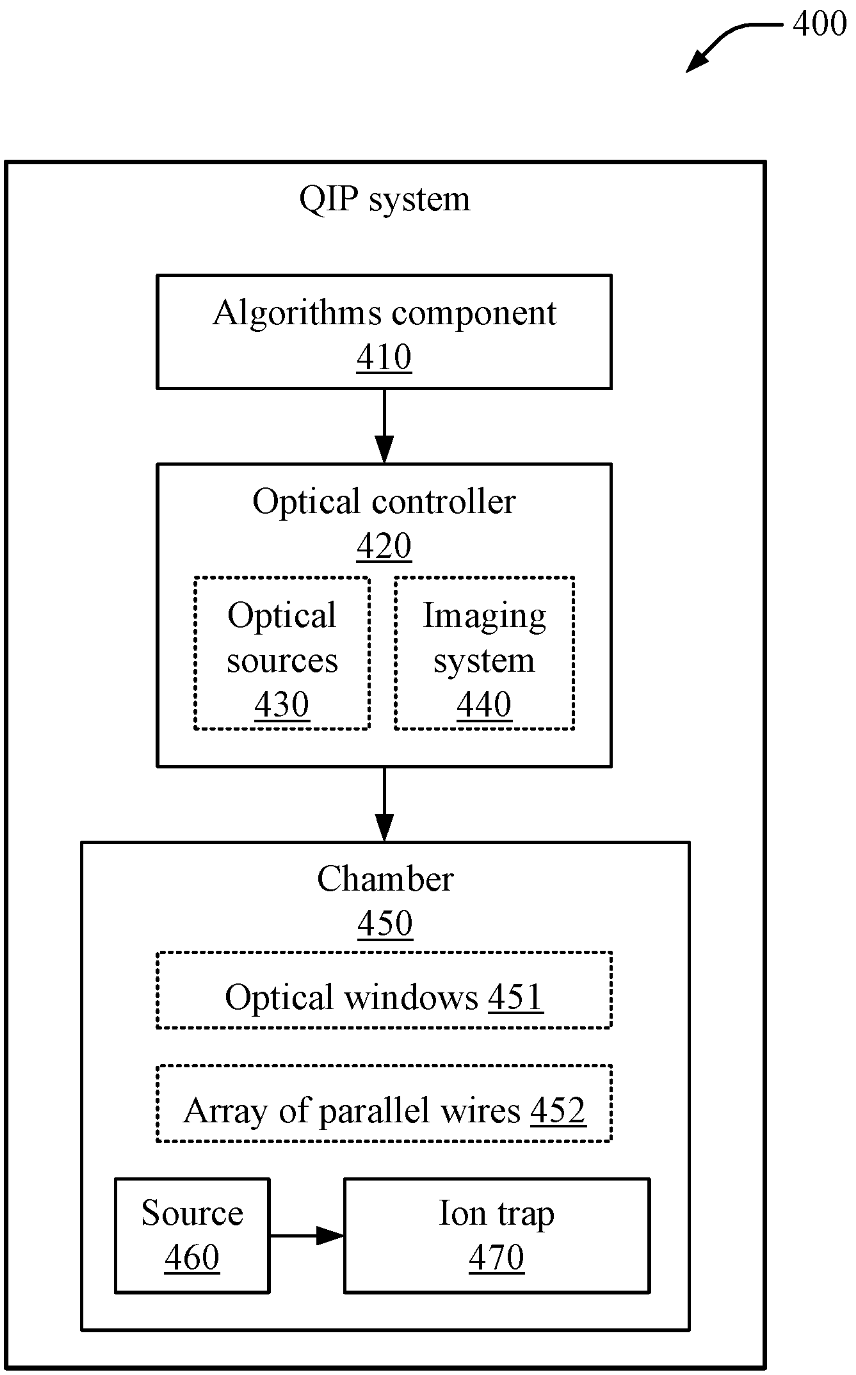
FIG. 4 is a block diagram that illustrates an example of a quantum information processing (QIP) system in accordance with aspects of this disclosure.

FIG. 4 is a block diagram that illustrates an example of a QIP system 400 in accordance with aspects of this disclosure. The QIP system 400 may also be referred to as a quantum computing system, a computer device, a trapped ion system, or the like.

The QIP system 400 can include a source 460 that provides atomic species (e.g., a flux of neutral atoms) to a chamber 450 having an ion trap 470 that traps the atomic species once ionized (e.g., photoionized) by an optical controller 420. The chamber 450 and the trap 470 may correspond to the chamber 210 and the trap 230, respectively, shown in the diagram 200 in FIG. 2. A single ion or a linear crystal or chain of ions like the linear chain 110 in the diagram 100 in FIG. 1 may be formed using the ion trap 470. The chamber 450 may include one or more optical windows 451, which may correspond to the dielectric component 220 in the diagram 200 in FIG. 2. The chamber 450 may also include one or more arrays of parallel wires 452 for shielding the ion trap 470. The array or arrays of parallel wires 452 may correspond to, for example, the array of parallel wires 310 in the plate 240 as shown in the diagram 300*a* in FIG. 3A.

Optical sources 430 in the optical controller 420 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 440 in the optical controller 420. In an aspect, the optical sources 430 may be implemented separately from the optical controller 420.

The imaging system 440 can include a high resolution imager (e.g., CCD camera) for monitoring the atomic ions while they are being provided to the ion trap or after they have been provided to the ion trap 470. In an aspect, the imaging system 440 can be implemented separate from the optical controller 420, however, the use of fluorescence to detect, identify, and label atomic ions using image processing algorithms may need to be coordinated with the optical controller 420.

The QIP system 400 may also include an algorithms component 410 that may operate with other parts of the QIP system 400 (not shown) to perform quantum algorithms or quantum operations, including a stack or sequence of combinations of single qubit operations and/or multi-qubit operations (e.g., two-qubit operations) as well as extended quantum computations. As such, the algorithms component 410 may provide instructions to various components of the QIP system 400 (e.g., to the optical controller 420) to enable the implementation of the quantum algorithms or quantum operations.

Figure 5:
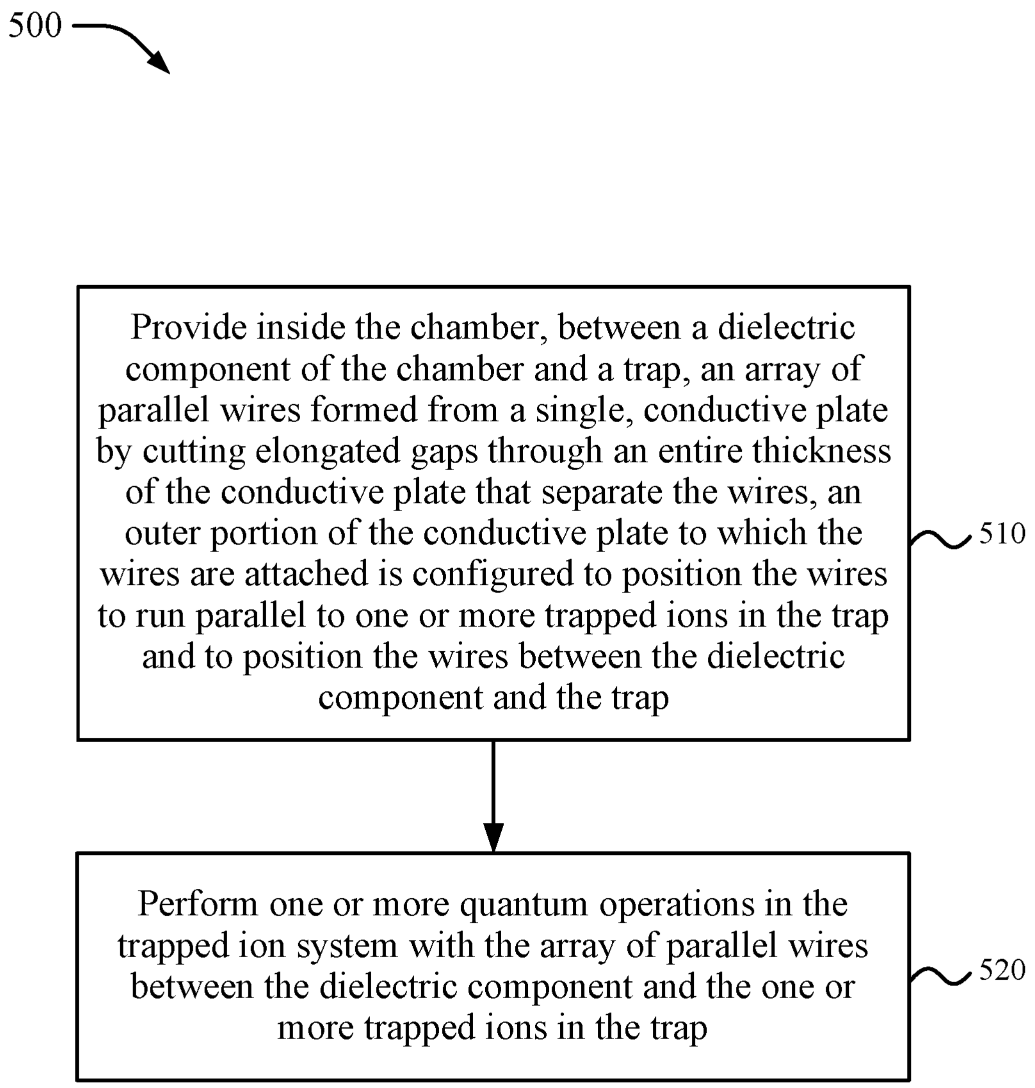
FIG. 5 is a flow diagram that illustrates an example of a method in accordance with aspects of this disclosure

Referring to FIG. 5, a method 500 for mitigating charges inside a chamber of a trapped ion system. The functions of the method 500 may be performed in connection with one or more components of a QIP system such as the QIP system 400 and its components.

At 510, the method 500 includes providing inside the chamber (e.g., the chamber 210), between a dielectric component (e.g., the dielectric component 220) of the chamber and a trap (e.g., the trap 230), an array of parallel wires formed from a single, conductive plate (e.g., the wires 310 in the plate 240) by cutting elongated gaps through an entire thickness of the conductive plate that separate the wires, an outer portion of the conductive plate to which the wires are attached is configured to position the wires to run parallel to one or more trapped ions in the trap and to position the wires between the dielectric component and the trap.

At 520, the method 500 includes performing one or more quantum operations in the trapped ion system (e.g., by the algorithms component 410 in the QIP system 400) with the array of parallel wires between the dielectric component and the one or more trapped ions in the trap.

In an aspect of the method 500, the dielectric component is an optical port, an optical window, a viewport, or the like used as part of a chamber to enable imaging and/or illumination from outside the chamber.

In connection with FIGS. 1-5 above, the present disclosure generally describes a device for mitigating charges inside a chamber of a trapped ion system that includes an array of parallel wires formed from a single, conductive plate by cutting elongated gaps through an entire thickness of the conductive plate that separate the wires, an outer portion of the conductive plate to which the wires are attached is configured to position the wires to run parallel to one or more trapped ions in the chamber and to position the wires between a dielectric component of the chamber and the one or more trapped ions.

In an aspect of this device, a width of each of the wires is the same and a width of each of the elongated gaps between the wires is the same. In an example, a width of each of the wires is approximately 50 μm and a width of each of the elongated gaps is approximately 460 μm. A number of the wires can be approximately 20 wires. Moreover, both ends of each elongated gap is a rounded end.

In another aspect of this device, the conductive plate is a square plate or a rectangular plate. The conductive plate can be a metal plate. The conductive plate can be approximately 20 mm by 20 mm.

In another aspect of this device, the outer portion of the conductive plate includes one or more fastening structures with which to attach the device inside the chamber to properly position the wires.

Also in connection with FIGS. 1-5 above, the present disclosure generally describes a chamber of a trapped ion system (e.g., a QIP system), that includes a dielectric component, a trap, and an array of parallel wires formed from a single, conductive plate by cutting elongated gaps through an entire thickness of the conductive plate that separate the wires, an outer portion of the conductive plate to which the wires are attached is configured to position the wires to run parallel to one or more trapped ions in the trap and to position the wires between the dielectric component and the trap.

In an aspect of this chamber, the dielectric component can be an optical port configured for imaging operations of the one or more ions in the trap. The dielectric component can be an optical port configured for transmission of one or more laser beams to control operations of the one or more ions in the trap.

In an aspect of this chamber, a width of each of the wires is the same and a width of each of the elongated gaps between the wires is the same. In an example, a width of each of the wires is approximately 50 μm and a width of each of the elongated gaps is approximately 460 μm. A number of the wires can be approximately 20 wires. Moreover, both ends of each elongated gap is a rounded end.

In another aspect of this chamber, the conductive plate is a square plate or a rectangular plate. The conductive plate can be a metal plate. The conductive plate can be approximately 20 mm by 20 mm.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A device for mitigating charges inside a chamber of a trapped ion system, comprising:

an array of parallel wires formed from a single, conductive plate by cutting elongated gaps through an entire thickness of the conductive plate that separate the wires, an outer portion of the conductive plate to which the wires are attached is configured to position the wires to run parallel to a chain of one or more trapped ions in the chamber and to position the wires between a dielectric component of the chamber and the chain of one or more trapped ions.

2. The device of claim 1, wherein a width of each of the wires is the same and a width of each of the elongated gaps between the wires is the same.

3. The device of claim 1, wherein the conductive plate is a square plate.

4. The device of claim 1, wherein the conductive plate is a metal plate.

5. The device of claim 1, wherein the conductive plate is approximately 20 millimeters by 20 millimeters.

6. The device of claim 1, wherein a width of each of the wires is approximately 50 microns.

7. The device of claim 1, wherein a width of each of the elongated gaps is approximately 460 microns.

8. The device of claim 1, wherein a number of the wires is approximately 20 wires.

9. The device of claim 1, wherein both ends of each elongated gap is a rounded end.

10. The device of claim 1, wherein the outer portion of the conductive plate includes one or more fastening structures with which to attach the device inside the chamber to position the wires.

11. A chamber of a trapped ion system, comprising:

a dielectric component;

a trap; and an array of parallel wires formed from a single, conductive plate by cutting elongated gaps through an entire thickness of the conductive plate that separate the wires, an outer portion of the conductive plate to which the wires are attached is configured to position the wires to run parallel to a chain of one or more trapped ions in the trap and to position the wires between the dielectric component and the trap.

12. The chamber of claim 11, wherein the dielectric component is an optical port configured for imaging operations of the one or more trapped ions in the trap.

13. The chamber of claim 11, wherein the dielectric component is an optical port configured for transmission of one or more laser beams to control operations of the one or more trapped ions in the trap.

14. The chamber of claim 11, wherein a width of each of the wires is the same and a width of each of the elongated gaps between the wires is the same.

15. The chamber of claim 11, wherein the conductive plate is a metal plate.

16. The chamber of claim 11, wherein the conductive plate is approximately 20 millimeters by 20 millimeters.

17. The chamber of claim 11, wherein a width of each of the wires is approximately 50 microns.

18. The chamber of claim 11, wherein a width of each of the elongated gaps is approximately 460 microns.

19. The chamber of claim 11, wherein the trapped ion system is a quantum information processing system.

20. A method for mitigating charges inside a chamber of a trapped ion system, comprising:

providing inside the chamber, between a dielectric component of the chamber and a trap, an array of parallel wires formed from a single, conductive plate by cutting elongated gaps through an entire thickness of the conductive plate that separate the wires, an outer portion of the conductive plate to which the wires are attached is configured to position the wires to run parallel to a chain of one or more trapped ions in the trap and to position the wires between the dielectric component and the trap; and performing one or more quantum operations in the trapped ion system with the array of parallel wires between the dielectric component and the chain of one or more trapped ions in the trap.

21. The method of claim 20, wherein the dielectric component is an optical port.

* * * * *